United States Patent
Gallucci et al.

(10) Patent No.: US 9,688,816 B2
(45) Date of Patent: Jun. 27, 2017

(54) POLYETHERIMIDE COMPOSITIONS AND METHODS FOR THE MANUFACTURE AND USE THEREOF

(71) Applicant: SABIC Global Technologies B.V., Bergen op Zoom (NL)

(72) Inventors: Robert R. Gallucci, Mt. Vernon, IN (US); James A. Mahood, Evansville, IN (US); Roy R. Odle, Mt. Vernon, IN (US); Steve Dimond, Bedford, NH (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 14/600,797

(22) Filed: Jan. 20, 2015

(65) Prior Publication Data
US 2015/0133625 A1 May 14, 2015

Related U.S. Application Data

(63) Continuation of application No. 13/564,352, filed on Aug. 1, 2012, now abandoned.

(60) Provisional application No. 61/526,032, filed on Aug. 22, 2011.

(51) Int. Cl.
C08G 73/10 (2006.01)
C08K 5/13 (2006.01)

(52) U.S. Cl.
CPC ..... C08G 73/1071 (2013.01); C08G 73/1046 (2013.01); C08G 73/1053 (2013.01); C08K 5/13 (2013.01)

(58) Field of Classification Search
CPC ............ C08G 73/1046; C08G 73/1057; C08G 2650/02; C08K 5/524; C08L 79/08
USPC .......................... 524/123, 128; 528/170, 185
See application file for complete search history.

(56) References Cited

U.S. PATENT DOCUMENTS

| | | | |
|---|---|---|---|
| 3,787,364 A | 1/1974 | Heath | |
| 3,847,869 A | 11/1974 | Williams | |
| 4,257,953 A | 3/1981 | Williams, III et al. | |
| 4,293,683 A | 10/1981 | Takekoshi et al. | |
| 4,318,857 A | 3/1982 | White et al. | |
| 4,324,883 A | 4/1982 | White et al. | |
| 4,329,292 A | 5/1982 | Webb | |
| 4,329,496 A | 5/1982 | Webb | |
| 4,417,044 A | 11/1983 | Parekh | |
| 4,443,592 A | 4/1984 | Schmidt et al. | |
| 4,554,357 A | 11/1985 | Verbicky, Jr. et al. | |
| 4,585,852 A | 4/1986 | Lo et al. | |
| 4,642,327 A | 2/1987 | Matzner et al. | |
| 5,229,482 A | 7/1993 | Brunelle | |
| 5,830,988 A | 11/1998 | Chan | |
| 5,969,079 A | 10/1999 | Lubowitz et al. | |
| 5,986,016 A | 11/1999 | Puyenbroek et al. | |
| 6,060,575 A | 5/2000 | Yang et al. | |
| 6,630,568 B1 | 10/2003 | Johnson et al. | |
| 6,849,706 B1 | 2/2005 | Brunelle et al. | |
| 7,563,817 B2 | 7/2009 | Ganesan et al. | |
| 2005/0288517 A1 | 12/2005 | Rai et al. | |
| 2006/0135741 A1 | 6/2006 | Gui et al. | |
| 2008/0044639 A1 | 2/2008 | Chan et al. | |
| 2009/0018265 A1 | 1/2009 | Kailasam et al. | |
| 2009/0326107 A1 | 12/2009 | Bittner | |

FOREIGN PATENT DOCUMENTS

CN 101200555 A 6/2008
GB 2244997 A 12/1991

OTHER PUBLICATIONS

International Patent Application No. PCT/US2012/051793: International Search Report and Written Opinion dated Jan. 17, 2013, 15 pages.
Sen, S. K., et al., "Spiro-biindane containing fluorinated poly(ether imide)s: Synthesis, characterization and gas separation properties", Journal of Membrane Science, Sep. 25, 2010, vol. 365, pp. 329-340.

*Primary Examiner* — Tae H Yoon
(74) *Attorney, Agent, or Firm* — Baker & Hostetler LLP

(57) ABSTRACT

This disclosure relates to polyetherimide compositions whose residual phenolic monomers exhibit little or no estradiol binding activity. Also disclosed are methods for making the disclosed polyetherimides and articles of manufacture comprising the disclosed polyetherimides.

17 Claims, No Drawings

POLYETHERIMIDE COMPOSITIONS AND METHODS FOR THE MANUFACTURE AND USE THEREOF

CROSS REFERENCE TO RELATED APPLICATIONS

This application is a continuation of U.S. patent application Ser. No. 13/564,352, filed Aug. 1, 2012, which claims the benefit of priority to U.S. Provisional Application No. 61/526,032, filed Aug. 22, 2011, which are hereby incorporated by reference in their entirety.

FIELD OF THE INVENTION

The present disclosure relates to polyetherimide compositions having, among other characteristics, significantly reduced or even no measurable level of estradiol like binding activity. Also included herein are methods for preparing and/or using the same, as well as articles formed from such compositions and blends

BACKGROUND OF THE INVENTION

Polyimides (PI), and in particular polyetherimides (PEI), are high performance polymers having a glass transition temperature (Tg) of greater than 180° C. These polymers further have high strength, heat resistance, and modulus, and broad chemical resistance. Polyetherimides are widely used in applications as diverse as automotive, telecommunication, aerospace, electrical/electronics, transportation, food service and healthcare. Adding a reinforcing filler helps provide materials that are particularly useful as molded parts for metal replacement, for example in automotive and electrical/electronic applications since these compositions offer good mechanical and thermal properties.

However, when prepared under certain conditions, polyetherimides can have small amounts of residual phenolic monomers. In some instances these impurities may correspond to the monomeric phenolic starting materials initially used to manufacture the polyetherimide. Besides affecting polymer properties, residual monomers can also be of concern in view of emerging regulatory considerations. Therefore, complete conversion of monomers is usually the desire of any polymer producer but is not always attainable. To that end, there remains a need in the art for thermoplastic polyetherimide compositions whose residual phenolic monomers exhibit certain beneficial characteristics. Desirable characteristics of such residual phenolic monomers include, among others, relatively little or even no estradiol binding activity.

SUMMARY OF THE INVENTION

This invention relates generally to polyetherimide compositions whose residual phenolic monomers, if present, exhibit relatively little or even no estradiol binding activity. The polyetherimide compositions are manufactured from starting materials that similarly exhibit relatively little or even no estradiol binding activity.

In view of the foregoing, embodiments of the invention generally provide a polyetherimide composition comprising repeating units derived from one or more phenolic monomers, wherein each of the one or more phenolic monomers does not exhibit a half maximal inhibitory concentration ($IC_{50}$) less than 0.00025M for alpha or beta in vitro estradiol receptors. Additionally, when the polyetherimide is prepared under conditions where small amounts of residual phenolic monomer are present with the polymer, each of the one or more residual phenolic monomers similarly does not exhibit a half maximal inhibitory concentration ($IC_{50}$) less than 0.00025M for alpha or beta in vitro estradiol receptors.

Further embodiments of the invention also provide polymer blends comprising the polyetherimide compositions disclosed herein.

In another embodiment, the present invention also provides various articles of manufacture comprising the polyetherimide compositions disclosed herein.

In still further embodiments, the invention provides methods for the manufacture of the disclosed polyetherimide compositions. According to some embodiments, a method is provided that generally comprises reacting an aromatic dihydroxy monomer salt and a bis halo or bis nitro phthalimide under conditions effective to provide a polyetherimide reaction product. This type of polyetherimide polymerization process is described, for example, in U.S. Pat. Nos. 5,229,482; 4,554,357; 3,847,869 and 3,787,364. The aromatic dihydroxy monomer is selected such that it does not exhibit a half maximal inhibitory concentration ($IC_{50}$) less than 0.00025M for alpha or beta in vitro estradiol receptors. The resulting polyetherimide is further characterized in that when the polyetherimide is prepared under conditions where the aromatic dihydroxy monomer is not completely incorporated into the polymer or not subsequently removed from the polymer, each of the one or more residual phenolic monomers does not exhibit a half maximal inhibitory concentration ($IC_{50}$) less than 0.00025M for alpha or beta in vitro estradiol receptors. In some instances the residual phenolic monomer content will be 100 ppm or less.

According to alternative embodiments, a method is provided that generally comprises reacting an aromatic bis (ether anhydride) with a diamine under conditions effective to provide a polyetherimide reaction product (as described, for example, in U.S. Pat. Nos. 4,585,852; 4,443,592 and 4,417,044). The aromatic bis(ether anhydride) may be derived from an aromatic dihydroxy monomer salt displacing a mono halo or nitro N-alkyl phthalimide to make a bis alkyl imide aromatic ether (as described, for example, in U.S. Pat. No. 4,257,953). The bis alkyl imide aromatic ether can be subsequently converted to an aromatic ether dianhydride, for example, as in U.S. Pat. Nos. 4,329,496; 4,329,292 and 4,318,857. The aromatic ether dianhydrides can be reacted with aryl or alkyl diamines as described in the art (for example U.S. Pat. Nos. 4,324,883; 4,324,883 and 4,293,683) to make polyetherimides. The aromatic bis(ether anhydride) thereby derived is from an aromatic dihydroxy monomer that does not exhibit a half maximal inhibitory concentration ($IC_{50}$) less than 0.00025M for alpha or beta in vitro estradiol receptors. The resulting polyetherimide is further characterized in that when the polyetherimide is prepared under conditions where the aromatic dihydroxy monomer is not completely incorporated into the bisimide monomer or polymer, or is not subsequently removed from the polymer, each of the one or more residual monomers does not exhibit a half maximal inhibitory concentration ($IC_{50}$) less than 0.00025M for alpha and/or beta in vitro estradiol receptors.

Additional advantages will be set forth in part in the description which follows. The advantages will be realized and attained by means of the elements and combinations particularly pointed out in the appended claims. It is to be understood that both the foregoing general description and the following detailed description are exemplary and explanatory only and are not restrictive.

DETAILED DESCRIPTION OF THE INVENTION

The present invention can be understood more readily by reference to the following detailed description, examples, drawings, and claims, and their previous and following description. However, before the present compositions, compounds, devices, systems, and/or methods are disclosed and described, it is to be understood that this invention is not limited to the specific compositions, compounds, devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those of ordinary skill in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to an "aromatic dihydroxy monomer" can include two or more such monomers unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular approximated value forms another aspect of the invention. It will be further understood that the endpoints of each of the ranges are significant both in relation to the other endpoint, and independently of the other endpoint.

All ranges disclosed herein are inclusive of the endpoints and are independently combinable. The endpoints of the ranges and any values disclosed herein are not limited to the precise range or value; they are sufficiently imprecise to include values approximating these ranges and/or values. Ranges articulated within this disclosure, e.g. numerics/values, shall include disclosure for possession purposes and claim purposes of the individual points within the range, sub-ranges, and combinations thereof. As an example, for the recitation of numeric ranges herein, each intervening number there between with the same degree of precision is explicitly contemplated—for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Various combinations of elements of this disclosure are encompassed by this invention, e.g. combinations of elements from dependent claims that depend upon the same independent claim.

As used herein, the terms "optional" or "optionally" mean that the subsequently described event, condition, component, or circumstance may or may not occur, and that the description includes instances where said event or circumstance occurs and instances where it does not.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$—units in the polyester, regardless of whether ethylene glycol was used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen or may be composed exclusively of carbon and hydrogen ("Alkyl"). Aliphatic groups may be substituted or unsubstituted. Exemplary aliphatic groups include, but are not limited to, methyl, ethyl, isopropyl, isobutyl, chloromethyl, hydroxymethyl (—$CH_2OH$), mercaptomethyl (—$CH_2SH$), methoxy, methoxycarbonyl ($CH_3OCO$—), nitromethyl (—$CH_2NO_2$), and thiocarbonyl.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl$_3$Ph-).

The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulfur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "integer" means a whole number and includes zero. For example, the expression "n is an integer from 0 to 4" means n may be any whole number from 0 to 4, including 0.

As used herein, the term half maximal inhibitory concentration (IC$_{50}$) is a quantitative measure that indicates how much of a particular substance, i.e., an inhibitor, is needed to inhibit a given biological process or component of a process, by one half. In other words, it is the half maximal (50%) inhibitory concentration (IC) of a substance (50% IC, or IC$_{50}$). It is commonly known to one of ordinary skill in the art and used as a measure of antagonist drug potency in pharmacological research. The (IC$_{50}$) of a particular substance can be determined using conventional competition binding assays. In this type of assay, a single concentration of radioligand (such as an agonist) is used in every assay tube. The ligand is used at a low concentration, usually at or below its K$_d$ value. The level of specific binding of the radioligand is then determined in the presence of a range of concentrations of other competing non-radioactive compounds (usually antagonists), in order to measure the potency with which they compete for the binding of the radioligand. Competition curves may also be computer-fitted to a logistic function as described under direct fit. The IC$_{50}$ is the concentration of competing ligand which displaces 50% of the specific binding of the radioligand.

As summarized above, the present invention provides polyetherimide compositions comprising repeating units derived in part from one or more aromatic dihydroxy monomers. The aromatic dihydroxy monomers used in the preparation of the polyetherimides exhibit relatively little or even no measurable estradiol binding activity as characterized by their half maximal inhibitory concentration (IC$_{50}$) for alpha or beta in vitro estradiol receptors. Specifically, according to some embodiments, the aromatic dihydroxy monomers of the invention do not exhibit a half maximal inhibitory concentration (IC$_{50}$) less than 0.00025M for alpha or beta in vitro estradiol receptors. According to further embodiments, each of the one or more aromatic dihydroxy monomers do not exhibit a half maximal inhibitory concentration (IC$_{50}$) less than 0.0003M, 0.00035M, 0.0004M, 0.00045M, 0.0005M, 0.00075M, or even 0.001M, for alpha or beta in vitro estradiol receptors. In still other embodiments, aromatic dihydroxy monomers do not exhibit any identifiable half maximal inhibitory concentration (IC$_{50}$) greater than or equal to about 0.00025M, 0.0003M, 0.00035M, 0.0004M, 0.00045M, 0.0005M, 0.00075M, or even 0.001M, for alpha and/or beta in vitro estradiol receptors.

According to some embodiments, aromatic dihydroxy monomers suitable for use in the polyetherimides of the invention include phenolic monomers. These phenolic monomers can comprise dihydric phenols (also known as bisphenols), mono phenols, or a combination thereof. To that end, specific examples of suitable phenolic monomers include, without limitation, resorcinol, hydroquinone, methyl hydroquinone, t-butyl hydroquinone, di-t-butyl hydroquinones (DTBHQ), biphenols, tetramethyl bisphenol-A, spiro biindane bisphenols (SBIBP), bis-(hydroxy aryl)-N-aryl isoindolinones, or any combination thereof. It should be understood that, in view of this disclosure, any additional suitable aromatic dihydroxy monomers exhibiting a lack of estradiol binding activity characterized by the half maximal inhibitory concentration values described above can be used.

As will be appreciated upon practice of the present invention, when the disclosed polyetherimides are subjected to very abusive conditions where the formation of one or more degradation products might occur, the resulting degradants or other chemical species if formed through an abusive degradation process will similarly exhibit relatively little or even no measurable estradiol binding activity as characterized by the half maximal inhibitory concentration ($IC_{50}$) for alpha or beta in vitro estradiol receptors. For example, according to some embodiments, degradants of the disclosed polyetherimides will not exhibit a half maximal inhibitory concentration ($IC_{50}$) less than 0.00025M for alpha or beta in vitro estradiol receptors. According to further embodiments, degradants of the disclosed polyetherimides do not exhibit a half maximal inhibitory concentration ($IC_{50}$) less than 0.0003M, 0.00035M, 0.0004M, 0.00045M, 0.0005M, 0.00075M, or even 0.001M, for alpha or beta in vitro estradiol receptors. In still other embodiments, degradants of the disclosed polyetherimides do not exhibit any identifiable half maximal inhibitory concentration ($IC_{50}$) greater than or equal to about 0.00025M, 0.0003M, 0.00035M, 0.0004M, 0.00045M, 0.0005M, 0.00075M, or even 0.001M, for alpha and/or beta in vitro estradiol receptors.

As will also be appreciated upon practice of the present invention, any residual monomer content of the disclosed polyetherimides will exhibit the half maximal inhibitory concentration ($IC_{50}$) values of the aromatic dihydroxy monomers described above. For example, according to some embodiments, any residual monomer content of the disclosed polyetherimides will not exhibit a half maximal inhibitory concentration ($IC_{50}$) less than 0.00025M for alpha or beta in vitro estradiol receptors. According to further embodiments, any residual monomer content of the disclosed polyetherimides do not exhibit a half maximal inhibitory concentration ($IC_{50}$) less than 0.0003M, 0.00035M, 0.0004M, 0.00045M, 0.0005M, 0.00075M, or even 0.001M, for alpha or beta in vitro estradiol receptors. In still other embodiments, any residual monomer content of the disclosed polyetherimides do not exhibit any identifiable half maximal inhibitory concentration ($IC_{50}$) greater than or equal to about 0.00025M, 0.0003M, 0.00035M, 0.0004M, 0.00045M, 0.0005M, 0.00075M, or even 0.001M, for alpha and/or beta in vitro estradiol receptors. To that end, according to embodiments of the invention, the disclosed polyetherimides comprise a residual monomer content that is preferably less than 100 ppm. According to still further embodiments, the disclosed polyetherimide comprise a residual monomer content less than 95 ppm, 90 ppm, 85, ppm, 80 ppm, 75 ppm, 70 ppm, 65 ppm, 60 ppm, 55 ppm, or event less than 50 ppm. Of course, in still further embodiments, the disclosed polysulfones contain essentially no residual monomer content. In some instances the residual phenolic monomer will be present in the polyetherimide polymer some number greater than zero and less than or equal to 1,000 ppm based on the polyetherimide polymer. In other instances the residual phenolic monomer will be present in the polyetherimide polymer at 0.1 to 1,000 ppm. In yet other instances the residual phenolic monomer will be present in the polyetherimide polymer at 1 to 1,000 ppm.

The disclosed polyetherimides can be synthesized by any conventionally known process for the manufacture of a polyetherimide. For example, and without limitation, the disclosed polyetherimides can be prepared by a conventional displacement polymerization reaction whereby a halo or nitro substituted bis phthalamide, such as a bis 4-chloro phthalimide, b is 4-fluoro phthalimide or bis 4-nitro phthalimide is reacted with a dianion salt of a disclosed aromatic dihydroxy compound under conditions effective to result in the desired polymerization. These displacement polymerizations are facilitated by the use of a phase transfer catalyst such a tetra butyl ammonium chloride, tetra phenyl phosphonium bromide, hexa ethyl guanidinium chloride or other conventionally known phase transfer catalysts. In other instances polyetherimde polymerization may be conducted in an aprotic polar solvent. In these displacement polymerization reactions the resulting resin can also be end capped to control molecular weight. Exemplary and non-limiting endcapping agents that can be used include mono chloro phthalimides or mono phenols. As described in further detail below, according to some embodiments, a preferred endcapping agent is phenol due to its lack of estradiol binding activity. In particular, phenol does not exhibit a half maximal inhibitory concentration ($IC_{50}$) less than 0.00025M for alpha or beta in vitro estradiol receptors Substituted bis phthalamides suitable for reacting with the dianion salt of a disclosed aromatic dihydroxy compound in a displacement polymerization can themselves be synthesized by any conventionally known process. According to some embodiments, such bis phthalimides can be selected from those bis phthalimides represented by the following structure:

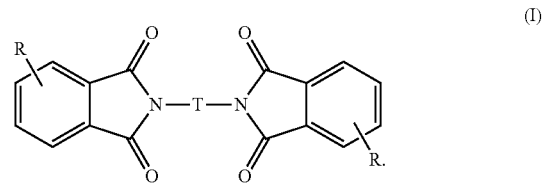

(I)

Linkage T in formula (I) includes substituted or unsubstituted divalent organic radicals such as (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (II)

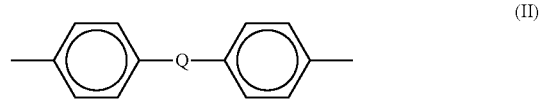

(II)

wherein Q includes a divalent moiety selected from the group consisting of —O—, —S—, —C(O)—, —SO2-, —SO—, -CyH2y- (y being an integer from 1 to 5), and halogenated derivatives thereof, including perfluoroalkylene groups. In a specific exemplary embodiment, linkage T represents a phenylene moiety, such as m-phenylene, which as one of ordinary skill in the art will understand, can be derived from m-phenylene diamine (mPD). Alternatively, in another specific and only exemplary embodiment, linkage T represents a diphenyl sulfone, which as one of ordinary skill in the art will again understand, can be derived from diamine diphenyl sulfone (DDS). With further reference to formula (I), the substituent R includes halogen or nitro. The substituents R are beneficially located in the 3,3', 3,4', 4,3', or 4,4' positions, and mixtures thereof.

In a second exemplary method, the disclosed polyetherimdes can be prepared by the reaction of an aromatic bis(ether anhydride) of the formula (III) with a stoichiometric amount of a diamine. The aromatic bis(ether anhydride) can be selected from the group represented by the following structure:

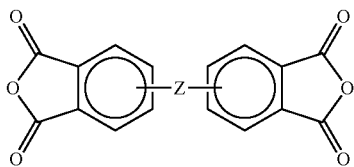

(III)

wherein linkage Z represents an aryl diether linkage of the general formula —O—Z'—O— derived from the disclosed aromatic dihydroxy compounds: including for example resorcinol, hydroquinone, methyl hydroquinone, t-butyl hydroquinone, di-t-butyl hydroquinones, biphenols, tetramethyl bisphenol-A, spiro biindane bisphenols, bis-(hydroxy aryl)-N-aryl isoindolinones or any combination thereof. Preferably, the divalent bonds of the —O—Z'—O— group are located in the 3,3', 3,4', 4,3', or the 4,4' positions. The bis(ether anhydride)s can, for example, be prepared by the hydrolysis, followed by dehydration, of the reaction product of a nitro substituted phenyl dinitrile with a metal salt of a disclosed aromatic dihydroxy compound in the presence of a dipolar, aprotic solvent. The ether dianhydrides can also be prepared by exchange of a bis imide with an anhydride, for instance phthalic anhydride. The polyetherimde may also be end capped with either aniline or phthalic anhydride.

Diamines that are well suited for polymerization with the above-described aromatic bis(ether anhydrides) include those represented by the formula:

$$H_2N—Y—NH_2 \quad (IV),$$

wherein Y in formula (IV) represents substituted or unsubstituted divalent organic radicals such as (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (II) as defined above. In a specific exemplary and non-limiting embodiment, a preferred amines for reacting with the disclosed aromatic bis(ether anhydrides) are aryl amines including m-phenylene diamine (mPD) and p-phenylene diamine (pPD). Alternatively, in another specific and only exemplary embodiment, a preferred aryl amine for reacting with the disclosed aromatic bis(ether anhydrides) includes diamino diphenyl sulfone (DDS). Such a polymer is a polyetherimide sulfone. Mixtures of diamines may also be employed. The substituents R are beneficially located in the 3,3', 3,4', 4,3', or 4,4' positions, and mixtures thereof.

The polyetherimides of the present invention can be provided as homopolymers comprising repeating units derived from a single aromatic dihydroxy monomer. Alternatively, in other embodiments, the polyetherimides of the invention can be provided as co-polyetherimides, comprising repeating units derived from two or more aromatic dihydroxy monomers or two or more diamines as described herein. According to these embodiments, it should be understood that the disclosed co-polyetherimides can be formulated to provide any desired relative mole ratio of repeating units within the chain of co-polyetherimides.

The relative mole ratio among the various monomeric components present in a copolymer will depend, in part, upon the total number of differing monomeric components present. The mole ratios can be expressed as relative mole percentages whereby the total mole percentage of monomeric components adds up to 100 mole %. For example, a copolymer comprising a first aromatic dihydroxy monomer and a second aromatic dihydroxy monomer can be provided wherein the relative mole percentage ratio of the first monomer to the second monomer is 90 mole % to 10 mole %, 80 mole % to 20 mole %, 75 mole % to 25 mole %, 70 mole % to 30 mole %, 60 mole % to 40 mole %, or even 50 mole % to 50 mole %. Polyetherimide homopolymers and copolymers may be blended separately or together in any combination.

In addition to the structural units described above, it is further contemplated that the polyetherimides of the present invention can comprise one or more non-polyetherimide additives. Preferably, the one or more non-polyetherimide additive also does not exhibit a half maximal inhibitory concentration ($IC_{50}$) less than 0.00025M for alpha or beta in vitro estradiol receptors. To that end, exemplary and non-limiting additives that can be incorporated into the polyetherimides include stabilizers, antioxidants, colorants, impact modifiers, flame retardants, branching agents, anti drip additives, mold release additives, lubricants, plasticizers, minerals (such as talc, clay, milled glass or glass spheres), reinforcement additives such as carbon or glass fibers, or any combination thereof. The amount of any such additive that can be used is that amount sufficient to result in the desired degree or effect for which the additive is intended. For example, if the additive is an antioxidant, color stabilizer or flame retardant the amount of additive will be that amount sufficient to provide a desired level of intended performance e.g. resistance to thermal aging, lower color or resistance to ignition. Such amounts can be readily determined by one of ordinary skill in the art without undue experimentation.

Any one or more of the above referenced non-polyetherimide additives can be provided as a phosphorous containing compound. Exemplary phosphorous containing compounds including phosphites and phosphonates or mixtures thereof. Thus, according to embodiments of the invention where phosphorous containing additives are present, it is preferable that the particular phosphorous containing additive similarly does not exhibit a half maximal inhibitory concentration ($IC_{50}$) less than 0.00025M for alpha or beta in vitro estradiol receptors. To that end, when such phosphorous containing additives are subjected to a hydrolysis reaction under conditions effective to provide one or more hydrolysis products, the hydrolysis product will similarly not exhibit a half maximal inhibitory concentration ($IC_{50}$) less than 0.00025M for alpha or beta in vitro estradiol receptors.

According to embodiments of the invention, suitable phosphite additives include diphenyl alkyl phosphites, phenyl dialkyl phosphites, trialkyl phosphites, dialkyl phosphites, triphenyl phosphites, diphenyl pentaerythritol diphosphite, or any combination thereof. The phosphite additives can be present in any desired or effective amount, when used the phosphite additives are preferably present in an amount in the range of from 0.00001 to 0.3 wt % phosphite, 0.00001 to 0.2 wt % phosphite, or even in the range of from 0.0001 to 0.01 wt % phosphite. Still further, it should be understood that a phosphorous containing additive such as a phosphite additive can have any desired molecular weight. However, according to a preferred embodiment, the phosphite additive has a molecular weight that is greater than 200 Daltons.

Conventional polymerization processes for manufacturing polyetherimides also commonly employ the use of a chain stopper (also referred to as an endcapping agent)

during the polymerization reaction. The chain stopper limits molecular weight growth rate, and thus can be used to controls molecular weight in the polyetherimide. To that end, many conventionally known end capping agents exhibit undesirably high levels of estradiol binding activity. In contrast, however, suitable end capping agents or chain stoppers for use with the present invention exhibit estradiol binding activity levels similar or even identical to that of the selected aromatic dihydroxy monomers. More specifically, the end capping agents suitable for use in the present invention also do not exhibit a half maximal inhibitory concentration ($IC_{50}$) less than 0.00025M for alpha or beta in vitro estradiol receptors. As such, any potential degradation product of the selected chain stopper, if formed, will likewise not exhibit a half maximal inhibitory concentration ($IC_{50}$) less than 0.00025M for alpha or beta in vitro estradiol receptors. Exemplary chain stoppers include certain mono amines (for example aniline), mono anhydrides (for example phthalic anhydride), mono-phenolic compounds and the like. In one embodiment, a suitable chain stopper for use in the present invention is phenol. Thus, when phenol is included as a chain stopper, the resulting polyetherimide comprises phenol as an end cap to the polymer chain. It should be understood however that the polyetherimides disclosed herein can be produced having any desired weight average molecular weight (Mw) with any end cap.

The disclosed polyetherimides can have any desired molecular weight. For example, disclosed polyetherimides can have weight average molecular weights in the range of from 3,000 to 80,000 Daltons, including exemplary molecular weights of 5,000, 7,000, 10,000, 15,000, 20,000, 25,000, 30,000, 35,000, 40,000 and 45,000, 50,000, 55,000, 60,000 and 65,000, 70,000 and 75,000. In still further examples, the weight average molecular weight (Mw) of a disclosed polyetherimides can be in a range of from any one of the above mentioned values to any other of the above mentioned values. For example, molecular weight of a disclosed polyetherimides can be in the range of from 3,000 to 80,000 Daltons. In still a further example, the molecular weight of a disclosed polyetherimides can be expressed as a value less than any one of the above disclosed values or, alternatively, can be expressed as a value greater than any one of the above disclosed values. For example, the molecular weight of a disclosed polyetherimides can be greater than 3,000 Daltons, or less than 80,000 Daltons. Molecular weight may be determined by gel permeation chromatography (GPC) as described, for example, in American Society for Testing Materials (ASTM) method D5296.

As used in the specification and claims herein, the term "compounding" refers to the intimate mixing of the polyetherimide and non-polyetherimide additives such as the phosphorous containing compound prior to preparation of a final product or article. Compounding is commonly performed by combining as-synthesized polyetherimide with the additive(s) and passing the mixture through an extruder to produce compounded pellets that can be dried and then further processed, for example into shaped articles. When dried, the pellets preferably have a moisture content less than about 100 ppm. Low moisture content is very important for formation of molded articles (especially injection molded articles) free from bubbles, voids or surface imperfections such as splay. Exemplary further melt processing can include injection molding, blow molding, extrusion, gas assist molding or compression molding processes. The additive(s) can be combined with the as-synthesized polyetherimide prior to any pelletizing, or after pelletization of the as-synthesized polyetherimide.

Compounding can be performed either in a melt or in solution. In the melt, the polyetherimide and additives can be melt mixed or kneaded together in an extruder, melt kneader, reactor or other system or device capable of melting and mixing the polyetherimide and the additives, followed by extrusion or pelletization, or by direct melt processing into shaped articles. In solution processing, the polyetherimide and additive(s) are combined in an inert solvent and maintained together for sufficient reaction time and temperature to reduce the color of the composition. The solvent is then removed, for example using vacuum. In some instances residual solvent for example chlorobenzene, o-dichlorobenzene, sulfolane, anisole or veratrole, should be less than 100 ppm. In other instances residual solvent will be less than 50 ppm.

The temperature of the extruder in the foregoing methods will generally be the conventional extruder temperature used for forming pellets of a particular thermoplastic polyetherimide. The appropriate extruder temperature will depend on the properties of both the polyetherimide and the additives. Higher molecular weight polyetherimides and/or high heat polyetherimides containing monomer units that increase the glass transition temperature of the polyetherimide will typically require higher extruder temperatures, so that the melt viscosity is low enough for sufficient mixing with the additives to occur. Suitable temperature ranges are 300 to 420° C., specifically 330 to 370° C. One skilled in the art will understand that the temperature of the polymer melt can vary somewhat from the extruder temperature depending on the occurrence of exothermic and/or endothermic reactions and processes and any heat generated by the mechanical mixing of the molten polymer.

The polyetherimide compositions of the invention can further be blended with additional thermoplastic resins or polymers. For example, and without limitation, the polyetherimides of the invention can be blended with polycarbonates, polyester carbonates, polyarylates, polyamides, polyphenylene sulfides, polyphenylene ethers, polyesters, polysulfones, polyethersulfones, polyphenylene ether sulfones, polyolefins, or any combination thereof.

In some instance the disclosed polyetherimides may exhibit a phenolic group content less than 20 meq/kg; a chloride content less than 20 ppm; a transition metal content less than 20 ppm; and a residual monomer content less than 100 ppm. Residual monomer content can be measured using standard techniques, such as gas or liquid chromatography, on an extract of the polymer. The extract can also be titrated to determine phenolic content. Chloride content can be determined for example by analysis of an aqueous extract of the polymer using for example ion chromatography (IC). Metals, including transition metals, and total chloride can be determined by pyrolysis/ashing of the sample followed by ion plasma chromatography (ICP) or other known techniques. Phenolic end groups of the polymer may be measured by known techniques such as titration, infrared spectroscopy (IR), and nuclear magnetic resonance (NMR). In one instance $^{31}P$ NMR analysis using phosphorous functionalization of end groups can be used to characterize the resins. Wherein the polyetherimide (PEI) resin was dissolved in $CDCl_3$ with pyridine and chromium acetylacetonate (CrAcAc) and the phenolic hydroxyl groups are phosphorylated with o-phenylene phosphoro chloridite to enhance the NMR signal.

In other instances the polyetherimide will have a Tg from 200 to 320° C., a weight gain on immersion in water for 24 hrs at 23° C. of less than 3.5% and a coefficient of expansion (CTE) from 30 to 50 ppm/° C.

The polyetherimides of the present invention are well suited for a variety of uses, including the manufacture of various articles. For example, and without limitation, the polyetherimide compositions of the invention can be used as either clear or opaque resins for medical uses, food service uses, housewares, electronics, packaging, computer enclosures, trays, drinking glasses, pitchers, syringes, connectors, filter housings, pipes, cell phone housings, keycaps, handles, bottles, films, coatings, and the like. In some instances articles can be formed by melt processing such as injection molding, extrusion or blow molding.

Specific non-limiting examples of polyetherimide compositions of the invention are illustrated below. In one embodiment, a polyetherimide is disclosed wherein the repeating units are derived from the reaction of the bis 4-chloro phthalimide of m-phenylene with di-tert butyl hydroquinone. Phenol can also be selected as the desired chain stopper. The resulting polyetherimide structure is shown below, wherein "n" can be any desired integer based upon the desired chain length for the co-polyetherimide.

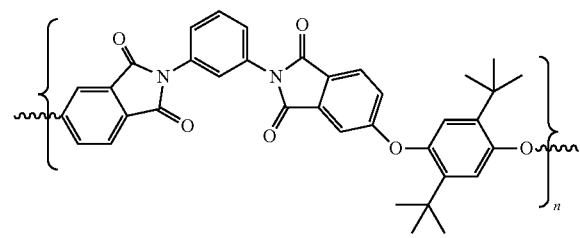

It is contemplated that this exemplified polyetherimide, and others disclosed herein, can be obtained having a Mw in the range of from 3,000 to 80,000 Daltons; a phenolic group content less than 20 meq/kg; a chloride content less than 100 ppm; a transition metal content less than 20 ppm; and a residual monomer content less than 100 ppm.

In another embodiment, a polyetherimide is disclosed wherein the repeating units are derived from the reaction of the bis 4-chloro phthalimide of m-phenylene with spiro biindane bisphenol (SBIBP). Phenol can again be selected as the desired chain stopper. The resulting polyetherimide structure is shown below, wherein "n" can be any desired integer based upon the desired chain length for the polyetherimide.

It is contemplated that this exemplified polyetherimide, and others disclosed herein, can be obtained having a Mw in the range of from 3,000 to 80,000 Daltons; a phenolic group content less than 20 meq/kg; a chloride content less than 100 ppm; a transition metal content less than 20 ppm; and a residual monomer content less than 100 ppm.

In another embodiment, a polyetherimide is disclosed wherein the repeating units are derived from the reaction of the bis 4-chloro phthalimide of m-phenylene with resorcinol. Phenol can again be selected as the desired chain stopper. The resulting polyetherimide structure is shown below, wherein "n" can be any desired integer based upon the desired chain length for the polyetherimide.

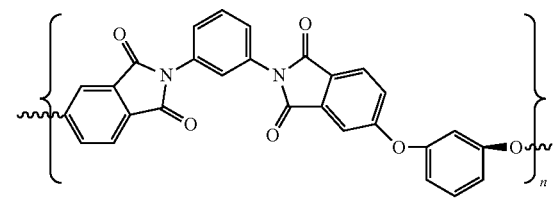

It is contemplated that this exemplified polyetherimide, and others disclosed herein, can be obtained having a Mw in the range of from 3,000 to 80,000 Daltons; a phenolic group content less than 20 meq/kg; a chloride content less than 100 ppm; a transition metal content less than 20 ppm; and a residual monomer content less than 100 ppm.

In still another embodiment, a polyetherimide is disclosed wherein the repeating units are derived from the reaction of the bis 4-chloro phthalimide of m-phenylene with N-phenyl phenolphthalein bisphenol. Phenol can again be selected as the desired chain stopper. The resulting polyetherimide structure is shown below, wherein "n" can be any desired integer based upon the desired chain length for the polyetherimide.

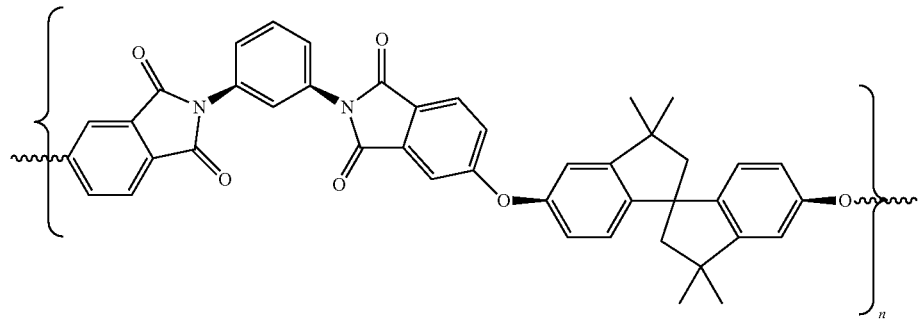

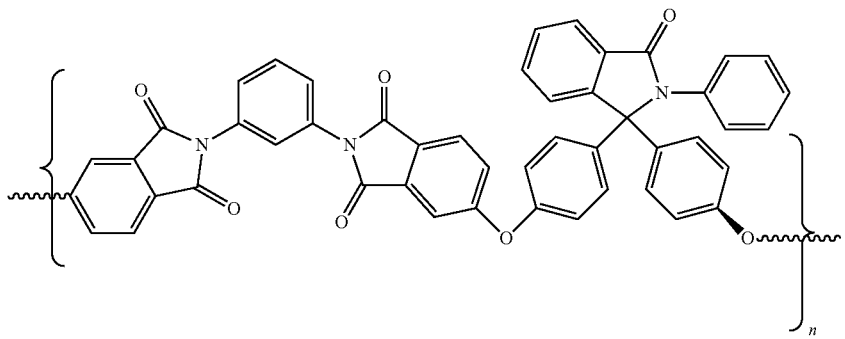

It is contemplated that this exemplified polyetherimide, and others disclosed herein, can be obtained having a Mw in the range of from 3,000 to 80,000 Daltons; a phenolic group content less than 20 meq/kg; a chloride content less than 100 ppm; a transition metal content less than 20 ppm; and a residual monomer content less than 100 ppm.

In still further embodiments, a polyetherimide is disclosed wherein the repeating units are derived from the reaction of the bis 4-chloro phthalimide of diamino diphenyl sulfone with resorcinol. Phenol can again be selected as the desired chain stopper. The resulting polyetherimide structure is shown below, wherein "n" can be any desired integer based upon the desired chain length for the polyetherimide.

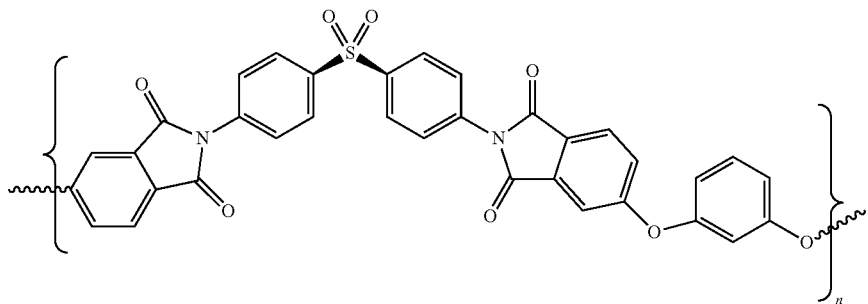

It is contemplated that this exemplified polyetherimide, and others disclosed herein, can be obtained having a Mw in the range of from 3,000 to 80,000 Daltons; a phenolic group content less than 20 meq/kg; a chloride content less than 100 ppm; a transition metal content less than 20 ppm; and a residual monomer content less than 100 ppm.

In still another embodiment, a co-polyetherimide is disclosed wherein the repeating units are derived from the reaction of the bis 4-chloro phthalimide of diamino diphenyl sulfone with spiro biindane bisphenol (SBIBP). Phenol can again be selected as the desired chain stopper. The resulting polyetherimide structure is shown below, wherein "n" can be any desired integer based upon the desired chain length for the co-polyetherimide.

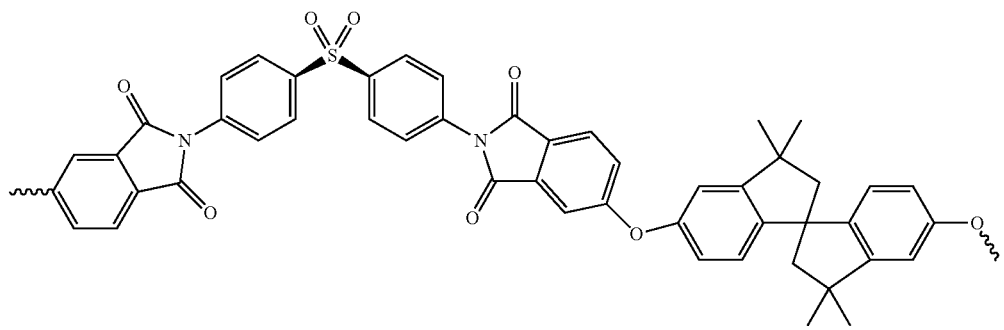

It is contemplated that this exemplified co-polyetherimide, and others disclosed herein, can be obtained having a Mw in the range of from 3,000 to 80,000 Daltons; a phenolic group content less than 20 meq/kg; a chloride content less than 100 ppm; a transition metal content less than 20 ppm; and a residual monomer content less than 100 ppm.

In yet another embodiment, a co-polyetherimide is disclosed wherein the repeating units are derived from the reaction of the bis 4-chloro phthalimide of m-phenylene diamine with resorcinol and di t-butyl hydroquinone. Phenol can again be selected as the desired chain stopper. The resulting polyetherimide structure is shown below, wherein "n" can be any desired integer based upon the desired chain length for the co-polyetherimide.

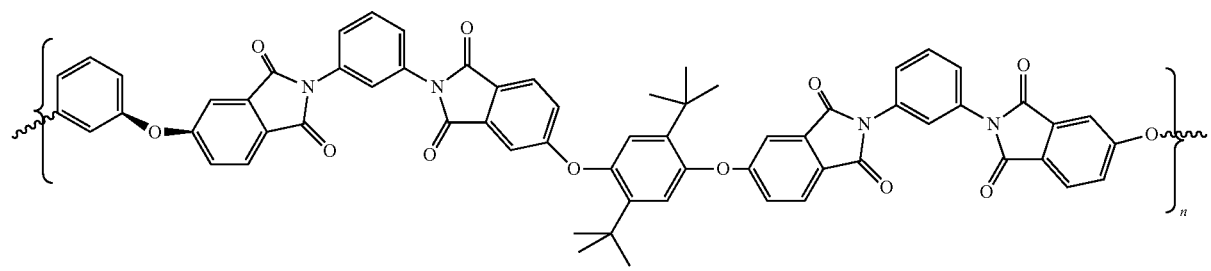

It is contemplated that this exemplified co-polyetherimide, and others disclosed herein, can be obtained having a Mw in the range of from 3,000 to 80,000 Daltons; a phenolic group content less than 20 meq/kg; a chloride content less than 100 ppm; a transition metal content less than 20 ppm; and a residual monomer content less than 100 ppm.

In a further embodiment, a co-polyetherimide is disclosed wherein the repeating units are derived from the reaction of the bis 4-chloro phthalimide of diamino diphenyl sulfone with spiro biindane bisphenol and resorcinol. Phenol can again be selected as the desired chain stopper. Other end groups are also contemplated. The resulting polyetherimide structure is shown below, wherein "n" can be any desired integer based upon the desired chain length for the co-polyetherimide.

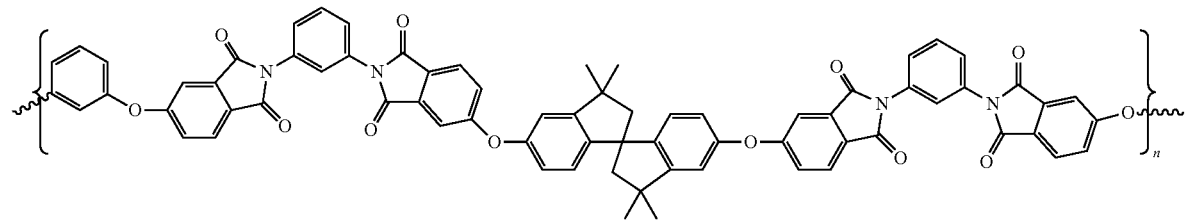

It is contemplated that this exemplified co-polyetherimide, and others disclosed herein, can be obtained having a Mw in the range of from 3,000 to 80,000 Daltons; a phenolic group content less than 20 meq/kg; a chloride content less than 100 ppm; a transition metal content less than 20 ppm; and a residual monomer content less than 100 ppm.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but normal experimental deviations should be accounted for. Unless indicated otherwise, parts are parts by weight, temperature is in C or is at ambient temperature, and pressure is at or near atmospheric. Examples of the invention are designated by numbers, control experiments are designated by letters.

Utilizing a conventional in vitro competitive binding assay as described above, estradiol binding activity was quantified by the half maximal inhibitory concentration ($IC_{50}$) value, which was evaluated for various phenolic compounds capable for use as component starting materials in the manufacture of polyetherimide compositions. These component starting materials might remain in the polymer during polymerizations run under certain conditions as residual monomers. Specifically, ($IC_{50}$) binding concentrations for the alpha or beta in vitro estradiol receptors for various compounds were tested. Three separate sets of tests were run using a standard competitive binding assay. Samples were dissolved in either ethanol or DMSO. The various phenolic compounds were then tested at up to seven different concentrations for each test phenolic compound. Each of those tests was run in triplicate. Tests were conducted by displacement of a radio-ligand. For each set of tests a 17b-estradiol control sample was run to ensure proper binding of the natural hormone under the test conditions.

The polyetherimide hydrolysis product to be tested (Tables 1 to 3) was investigated as to its binding affinity for recombinant human estradiol receptors (rhER) alpha ($\alpha$) and beta 1 ($\beta$1) in vitro. 17$\beta$-Estradiol ($E_2$) was used a standard whose relative binding affinity was defined as 100%. Competitive binding assays were performed by incubating rhER alpha ($\alpha$) and beta 1 ($\beta$1) receptors with 10 nM [$^3$H]estradiol (the radio ligand) in the presence or absence of increasing concentrations, 0.25 to 250,000 nM, of the phenolic test compounds of Tables 1 to 3 (nM is nano molar). Each data point is the average of at least two assays. Stock solutions of the compounds of Tables 1 to 3 were prepared at 10×E-2 M in 100% ethanol, water or DMSO (dimethyl sulfoxide). Compounds were diluted 10 fold in binding buffer and then 1:4 in the final assay mix. The final concentration of ethanol or DMSO in the assay well was 5%. The highest concentration of the hydrolysis test compound was 2.5×E-4 M (250,000 nM). The residual monomers of Tables 1 to 3 were tested at seven concentrations over log increments. The lowest concentration was 2.5×E-10 M (0.25 nM). The $IC_{50}$ is the concentration of test substance at which about 50% of the radio labeled estradiol was displaced from the estradiol receptor.

In some very surprising instances (see Tables 1 to 3) the disparate phenolic compounds: tetra methyl bisphenol-A (TMBPA), phenol, N-phenyl phenolphthalein bisphenol (PPPBP), resorcinol, biphenol (BP), spiro biindane bisphenol (SBIBP), di t-butyl hydroquinone (DTBHQ) and methyl hydroquinone (MHQ) show no estradiol binding, even at the highest concentration. In terms of their ability to bind to alpha or beta estradiol hormone receptors these phenolic compounds show a surprising reduction in activity. In some instances no binding can be measured using standard biochemical analysis techniques to test estradiol binding activity. That is even at a concentration of 2.5×E-4 M there was no displacement of estradiol. Note that 17b-estradiol binds at very low concentrations of 1.0 to 14.7×E-9 M in our various control experiments and is much more active than any of the phenolic compounds tested.

The ($IC_{50}$) values obtained from these experiments are provided in the tables below. As shown, many mono and bisphenols show an undesired high level of receptor binding. However very surprisingly the preferred phenolic compounds utilized to prepare the polyetherimide compositions of the invention (tetra methyl bisphenol-A (TMBPA), phenol, N-phenyl phenolphthalein bisphenol (PPPBP), resorcinol, biphenol (BP), spiro biindane bisphenol (SBIBP), di t-butyl hydroquinone (DTBHQ) and methyl hydroquinone (MHQ)) either did not show any detectable estradiol binding in these tests or, at a minimum, did not exhibit an ($IC_{50}$) binding concentrations less than 2.5×E-4 M. An entry of >2.5×E-4 for compounds in Tables 1 to 3 indicates that those compounds did not compete to the extent of 50% with radio labeled 17b-estradiol at the highest concentration (250,000 nM) tested. There was no estradiol displacement and hence no IC50 could be determined. The IC50, if identifiable at all, may be some value greater than 2.5×E-4M.

The estradiol displacement experiments of set 1 (Table 1) show that the phenolic compounds; p-cumyl phenol (control example B), dihydroxy diphenyl ether (control example C), bisphenol acetophenone (control example D), dimethyl acetophenone bisphenol (control example E), diphenolic acid methyl ester (control example F) and dimethyl cyclohexyl bisphenol (control example G) all displace estradiol at low concentrations. Surprisingly, under the same conditions, tetra methyl BPA (Example 1), phenol (Example 2), N-phenyl phenolphthalein bisphenol (Example 3) and resorcinol (Example 4) show no detectible estradiol displacement at either the alpha or beta receptor at as high as 2.5×E-4 molar concentration.

TABLE 1

Table 1: Experimental Set 1

| Example | Compounds | IC50 rhER alpha | IC50 rhER beta |
|---------|-----------|-----------------|----------------|
| A | 17b-estradiol control | 1.0 × E−9 | 8.2 × E−9 |
| B | p-Cumyl Phenol (CAS# 599-64-4) | 1.4 × E−4 | 9.8 × E−6 |
| C | Dihydroxy Diphenyl Ether (CAS# 1965-09-9) | 6.0 × E−5 | 1.4 × E−5 |
| D | Bisphenol Acetophenone (CAS# 1571-75-1) | 1.2 × E−5 | 1.4 × E−6 |
| E | Dimethyl Acetophenone Bisphenol (CAS# 4754-63-6) | 4.8 × E−6 | 3.5 × E−6 |
| F | Diphenolic Acid Methyl Ester (CAS# 7297-85-0) | 1.9 × E−5 | 1.1 × E−5 |
| G | Dimethyl Cyclohexyl Bisphenol (CAS# 2362-14-3) | 1.3 × E−6 | 3.1 × E−6 |
| 1 | Tetra Methyl BPA (CAS# 5613-46-7) | >2.5 × E−4 | >2.5 × E−4 |
| 2 | Phenol (CAS# 108-95-2) | >2.5 × E−4 | >2.5 × E−4 |
| 3 | N-Phenyl Phenolphthalein Bisphenol (CAS# 6607-41-6) | >2.5 × E−4 | >2.5 × E−4 |
| 4 | Resorcinol (CAS# 108-46-3) | >2.5 × E−4 | >2.5 × E−4 |

IC50 is the conc. of the candidate that displaces 50% of the radioactive ligand from the rhER cells
>2.5 × E4 compounds did not compete to the extent of 50% with radiolabeled 17B-estradiol at the highest conc. (250,000 nM) tested, no IC50 can be determined In a second set of experiments (Table 2) phenolic compounds structurally similar to, but not identical to those of set 1, were tested as to their ability to displace estradiol. The surprising and unpredictable trend of estradiol displacement is again observed. The bis phenolic compounds: fluorenone bis o-cresol (control example I), hydro isophorone bisphenol (control example J), bisphenol M (control example K), and bis hydroxy phenyl menthane (control example L) all displace estradiol at low concentrations. On the other hand, spiro biindane bisphenol (Example 5), biphenol (Example 6) and di t-butyl hydroquinone (Example 7) all show no displacement of the estradiol at the alpha receptor at 2.5×E-4 M concentration. Examples 5 and 7 also show no displacement at the beta receptor. 17b-Estradiol (control example H) binds at a very low concentration.

TABLE 2

Table 2: Experimental Set 2

| Example | Compounds | IC50 rhER alpha | IC50 rhER beta |
|---------|-----------|-----------------|----------------|
| H | 17b-estradiol control | 7.0 × E−9 | 6.6 × E−9 |
| I | Fluorenone Bis-o-Cresol (CAS# 88938-12-9) | 9.7 × E−6 | 2.5 × E−5 |
| J | Hydro Isophorone Bisphenol (CAS# 129188-99-4) | 4.5 × E−7 | 1.1 × E−6 |
| K | Bisphenol M (CAS# 13595-25-0) | 2.1 × E−6 | 1.4 × E−6 |
| L | Bis Hydroxy Phenyl Menthane (CAS# 58555-74-1) | 4.9 × E−7 | 6.7 × E−7 |
| 5 | Spiro Biindane Bisphenol (CAS# 1568-80-5) | >2.5 × E−4 | >2.5 × E−4 |
| 6 | Biphenol (CAS# 92-88-6) | >2.5 × E−4 | 1.7 × E−6 |
| 7 | Di t-Butyl Hydroquinone (CAS# 88-58-4) | >2.5 × E−4 | >2.5 × E−4 |

IC50 is the conc. of the candidate that displaces 50% of the radioactive ligand from the rhER cells
>2.5 × E4 compounds did not compete to the extent of 50% with radiolabeled 17B-estradiol at the highest conc. (250,000 nM) tested, no IC50 can be determined In yet another set of experiments (Table 3) undesirable estradiol displacement at low concentration is observed for the bisphenols benzophenone bisphenol (control example N) and phenolphthalein (control example O) while methyl hydroquinone (Example 8) surprisingly shows no alpha or beta estradiol displacement at as high as 2.5×E-4 molar concentration. As in the other sets of experiments (Tables 1 to 3) an estradiol control (example M) was run as part of the set to establish a baseline of estradiol displacement. Estradiol displaces at much lower concentration than any of the phenolic compounds.

TABLE 3

Table 3: Experimental Set 3

| Example | Compounds | IC50 rhER alpha | IC50 rhER beta |
|---------|-----------|-----------------|----------------|
| M | 17b-estradiol control | $10.0 \times E{-}9$ | $14.7 \times E{-}9$ |
| N | Benzophenone bisphenol (CAS# 611-99-4) | $3.1 \times E{-}5$ | $3.2 \times E{-}6$ |
| O | Phenolphthalein (CAS# 77-09-8) | $3.7 \times E{-}6$ | $1.4 \times E{-}5$ |
| 8 | Methyl Hydroquinone (CAS# 95-71-6) | $>2.5 \times E{-}4$ | $>2.5 \times E{-}4$ |

IC50 is the conc. of the candidate that displaces 50% of the radioactive ligand from the rhER cells
$>2.5 \times E4$ compounds did not compete to the extent of 50% with radiolabeled 17B-estradiol at the highest conc. (250,000 nM) tested, no IC50 can be determined The estradiol binding of phenolic compounds seems to be very unpredictable. It does not correlate with molecular weight, phenolic group separation, molecular rigidity, solubility, steric or electronic effects. Note that while the phenolic compounds of our invention show no displacement at the alpha or beta estradiol binding sites at concentration below the 2.5×E-4M limit of detection, even the control examples, while showing some binding, are not as reactive as estradiol (control examples A, H and M). 17b-Estradiol binds at a very low concentration.

Polyetherimide Preparation & Testing
Procedure for Dianhydride Preparation.

Under a nitrogen atmosphere, a mixture of (1 mol) of the disodium salt of the bisphenols: bis-(4-hydroxyphenyl)-N-phenyl phenolphthalein or 2,2'6'6'-tetramethyl bisphenol A and 4-fluorophthalic anhydride (2 mol) were dissolved in dried DMAC (dimethyl acetamide) and heated at 180° C. The solution became homogeneous after 5 to 10 min. The solution was stirred for a total of one hour and allowed to cool to room temperature. The reaction mixture was then poured into a mixture of 200 ml of 1N aqueous HCl and ice. The resulting yellow to white precipitate was filtered and washed with 50 ml of water and then methanol to give 80 to 85% of the desired dianhydride shown in the figures below. The dianhydrides were recrystallized in acetic acid and acetic anhydride respectively resulting in pure compounds (50 to 55% yield).

Polymerization Procedure.

In a typical experiment a 25 ml test tube was charged with (0.6870 mmol) of dianhydride and (0.6870 mmol) of m-phenylenediamine (mPD). To the reaction mixture was added 3.6 g of o-dichlorobenzene (ODCB) as a solvent. The reaction mixture was refluxed at 180° C. for 4 h. After 4 h, the reaction mixture was poured into a Teflon coated aluminum foil made into a tube. The tube was heated in a hot block up to 380° C. for 20 min. to remove the solvent yielding the N-phenyl phenolphthalein meta phenylene diamine (mPD) polyetherimide (Example 9) and tetra methyl BPA mPD polyetherimide (Example 10).

Example 9

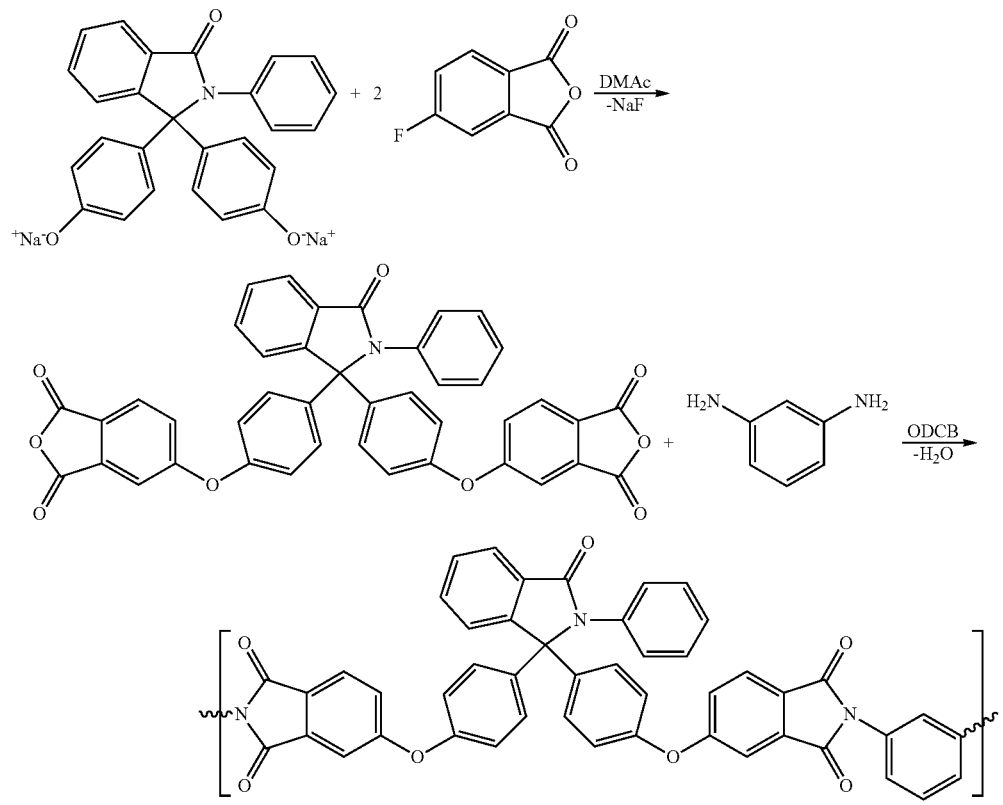

Example 10

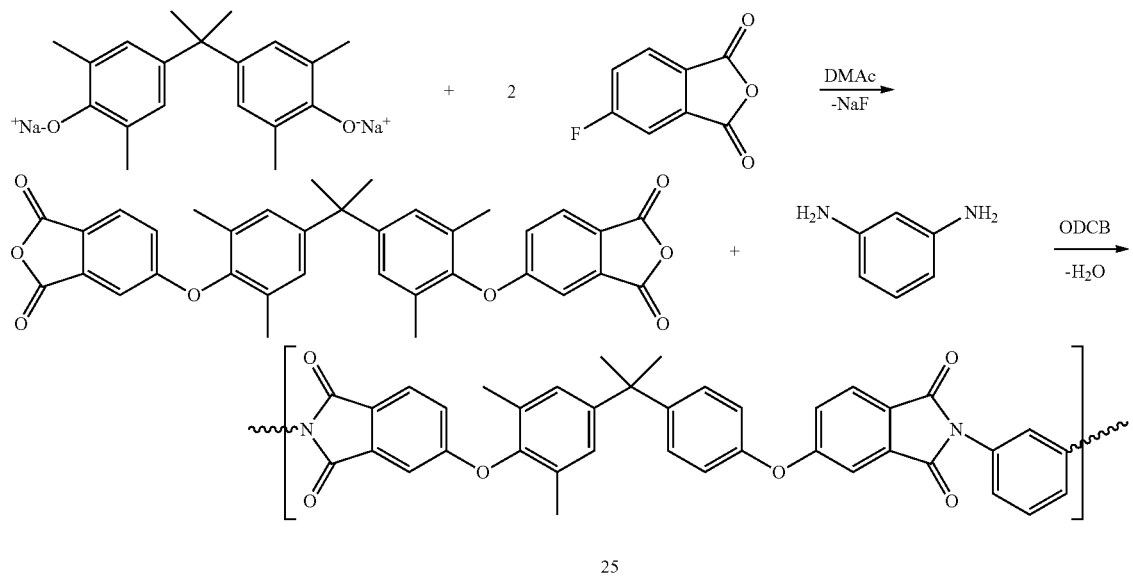

Molecular Weight Analysis by GPC.

Molecular weights were determined by gel permeation chromatography (GPC) analysis with a Waters 2695 Separations Module equipped with a Polymer Labs Pigel 5 μm MIXED-C column and Waters 2487 PDA detector at 254 nm. Elution was effected with isocratic solvent system of dichloromethane at 1 mL/min and Mw is reported relative to polystyrene standards obtained from Polymer Labs. Each sample was run for 15 minutes with an injection volume of 5 μL.

TGA and DSC Measurements.

Thermal Gravimetric Analysis (TGA) measurements were performed with a TA Q800 TGA. The samples were scanned from 40° C. to 800° C. under nitrogen with a heating rate of 20° C./min. Differential Scanning calorimetry (DSC) measurements were performed with a TA Q1000 DSC. The samples were scanned from 40° C. to 350° C. under nitrogen atmosphere. The glass transition temperatures ($T_g$), of the polymers were determined from the second heating at the rate of 20° C./min.

Characterization of the polymers of Examples 9 and 10 are shown in Table 4. The N-phenyl phenolphthalein (PP-PBP) mPD polyetherimde (Example 9) had a Tg of 290° C., the tetra methyl BPA (TMeBPA) polyetherimide mPD (Example 10) had a Tg of 249° C. both considerably above the 217° C. Tg of the bisphenol A (BPA) dianhydride based mPD polyetherimide (control example P).

The polymers made from the indicated dianhydride and m-phenylene diamine had weight average molecular weights (Mw) of 49,800 and 56,800 and number average (Mn) molecular weights of 24,300 and 26,800 which were above the BPA dianhydride derived polyetherimide control (Table 4).

Thermal gravimetric analyses (TGA) were run in nitrogen to determine the temperature of peak decomposition. Both the N-phenyl phenolphthalein and tetra methyl BPA polyetherimides show very good resistance to decomposition with a peak rate of decomposition above 500° C. The total weight loss at 800° C. was less than 60% of the starting polymer weight.

TABLE 4

Polymer Properties

| Example | PEI-MPD Polymer | GPC Mw | GPC Mn | PDI | Tg (° C.) | peak wt. loss in $N_2$ | % wt loss 800° C. ($N_2$) |
|---|---|---|---|---|---|---|---|
| P | BPA | 38000 | 17700 | 2.15 | 217 | 554 | 49 |
| 9 | PPPBP | 49800 | 24300 | 2.05 | 290 | 581 | 45 |
| 10 | TMeBPA | 56800 | 26800 | 2.12 | 249 | 505 | 55 |

Examples 11 to 22

A further set of polyetherimides, examples 11 to 22 were prepared from the phenolic monomers: di-tert butyl hydroquinone (DTBHQ), methyl hydroquinone (MHQ), spiro biindane bisphenol (SBIBP) and N-phenyl phenyl phenolphthalein (PPPBP) that show no displacement at the alpha or beta estradiol binding sites at concentration below the 2.5× E-4M. One equivalent of the disodium salts of the aforementioned bisphenols were separately reacted with two equivalents of 4-fluoro phthalic anhydride for 1 hr at 170° C. in dimethyl acetamide (DMAC) as described in the procedure for dianhydride preparation of examples 9 and 10. The resultant dianhydrides were recovered from solution and purified by methanol washing and/or recrystallization. The DTBHQ-dianhydride and MHQ-dianhydride were recrystallized from methanol, the SBIBP-dianhydride from acetic anhydride and the PPPBP dianhydride from acetonitrile. The dianhydrides were then polymerized with one equivalent of meta-phenylene diamine (mPD), para-phenylene diamine (pPD) or diamino diphenyl sulfone (SDA) in a solution of DMAC at room temperature for at least 1 hr. to make an amide acid imide polymer. The 12.5% solids amide acid imide solutions were fully imidized with removal of DMAC solvent under nitrogen to prepare thin films by gradually heating from 25 to 375° C. The heating schedule to remove solvent and complete imidization is shown in Table 5.

TABLE 5

Film Casting of Amide Acid DMAC Solution

| | Time (min.) | | | | | | | | |
|---|---|---|---|---|---|---|---|---|---|
| | 0 | 45 | 60 | 90 | 120 | 150 | 165 | 180 | 195 | 225 |
| T ° C. | 25 | 40 | 40 | 120 | 120 | 160 | 160 | 200 | 200 | 375 |

The polyimide films were characterized by: DSC to measure Tg (20° C./min heating rate), % wt. gain after 24 hr. immersion in water at 23° C. and the onset of weight loss under nitrogen and air by thermo gravimetric analysis (TGA). Coefficient of thermal expansion (CTE) was measured in ppm/° C. by thermo mechanical analyses during heating from −50 to 170° C. The data for the various polyetherimides is shown in Table 6. The polyetherimides of examples 11 to 22 all show high heat capability with a glass transition temperature (Tg) above 200° C. Good thermal stability was shown by less than 1% TGA weight loss below 400° C. in either air or nitrogen. A CTE of 36 to 47 ppm/° C. showed good dimensional stability. Moisture absorption is 3.15% or less for all the polyetherimides of Table 6 with many polymers having 2.65% or less weight gain on immersion in water at 23° C. for 24 hrs. Note that example 20 is a replicate of example 9. In this instance the polymers with pPD, examples 12 and 15, were too brittle to allow reliable measurements to be made.

TABLE 6

Polyetherimide Properties Examples 11 to 22

| Example | Composition | Tg ° C. (DSC) | TGA decomp. Temp. ° C. (N2) | TGA decomp. Temp. ° C. (Air) | % water abs | CTE ppm −50 to 170° C. |
|---|---|---|---|---|---|---|
| 11 | DTBHQ-mPD | 252 | 455 | 468 | 1.47 | 44.1 |
| 12 | DTBHQ-pPD | 272 | 490 | 490 | 1.25 | film too brittle |
| 13 | DTBHQ-SDA | 286 | 474 | 485 | 1.27 | 47.1 |
| 14 | MHQ-mPD | 253 | 458 | 450 | 2.01 | 41.3 |
| 15 | MHQ-pPD | not detected | 476 | 462 | film too brittle | film too brittle |
| 16 | MHQ-SDA | 275 | 457 | 460 | 2.12 | 44.8 |
| 17 | SBIBP-mPD | 265 | 513 | 517 | 1.21 | 41.3 |
| 18 | SBIBP-pPD | 281 | 513 | 509 | 1.47 | 46.8 |
| 19 | SBIBP-SDA | 285 | 512 | 510 | 1.60 | 46.2 |
| 20 | PPPBP-mPD | 290 | 513 | 551 | 2.65 | 36.2 |
| 21 | PPPBP-pPD | 305 | 522 | 524 | 2.83 | 40.9 |
| 22 | PPPBP-SDA | 309 | 521 | 550 | 3.15 | 38.7 |

What is claimed is:

1. A method of producing an article having low estradiol binding activity comprising,
   identifying an article for which estradiol binding activity is to be low,
   selecting one or more phenolic monomers from di-t-butyl hydroquinones and bis-(hydroxy aryl)-N-aryl isoindolinones,
   or,
   selecting at least two phenolic monomers from one of:
   (a) di-t-butyl hydroquinone, spiro biindane bisphenols, resorcinol, hydroquinone, methyl hydroquinone, and biphenols;
   (b) di-t-butyl hydroquinone, spiro biindane bisphenols, hydroquinone, and biphenols;
   (c) di-t-butyl hydroquinone, spiro biindane bisphenols, methyl hydroquinone, and biphenols;
   (d) di-t-butyl hydroquinone, spiro biindane bisphenols, resorcinol, hydroquinone, methyl hydroquinone, and tetramethyl bisphenol-A;
   (e) di-t-butyl hydroquinone, spiro biindane bisphenols, hydroquinone, and tetramethyl bisphenol-A; and,
   (f) di-t-butyl hydroquinone, spiro biindane bisphenols, methyl hydroquinone, and tetramethyl bisphenol-A;
   wherein each of said monomers do not exhibit a half maximal inhibitory concentration (IC50) less than 0.00025M for alpha or beta in vitro estradiol receptors, and
   manufacturing the article with a polyetherimide composition comprising repeating units derived from the one or more phenolic monomers, and wherein one or more residual phenolic monomers are present at more than zero but less than or equal to 1,000 ppm and do not exhibit a half maximal inhibitory concentration (IC50) less than 0.00025M for alpha or beta in vitro estradiol receptors.

2. The method of claim 1, wherein the polyetherimide is end capped with phenol.

3. The method of claim 1, wherein the polyetherimide is a co-polyetherimide comprising repeating units derived from the two or more phenolic monomers.

4. The method of claim 1, wherein the polyetherimide composition further comprises one or more additives and wherein each of the one or more additives does not exhibit a half maximal inhibitory concentration (IC50) less than 0.00025M for alpha or beta in vitro estradiol receptors.

5. The method of claim 4, wherein the one or more additive comprises a stabilizer, antioxidant, colorant, impact modifier, flame retardant, anti drip additive, mold release additive, lubricant, plasticizer, mineral, reinforcement additive, or any combination thereof.

6. The method of claim 4, wherein the one or more additive comprises a phosphite and wherein when the phosphite, phosphonate or mixture thereof is subjected to conditions effective to provide one or more phosphite, or phosphonate hydrolysis product, each of the one or more phosphite or phosphonate hydrolysis products does not exhibit a half maximal inhibitory concentration (IC50) less than 0.00025M for alpha or beta in vitro estradiol receptors.

7. The method of claim 6, wherein the phosphite comprises a diphenyl alkyl phosphite, phenyl dialkyl phosphite, trialkyl phosphite, dialkyl phosphite, triphenyl phosphite, diphenyl pentaerythritol diphosphite, or any combination thereof.

8. The method of claim 6, wherein the phosphite has a Mw greater than 200 Daltons.

9. The method of claim 1, wherein the polyetherimide composition further comprises:
   a) a Mw in the range of from 3,000 to 80,000 Daltons;
   b) a phenolic end group content less than 20 meq/kg;
   c) a chloride content less than 1000 ppm; and
   d) a transition metal content less than 20 ppm; and
   wherein the one or more residual phenolic monomers are present at more than zero but less than 100 ppm.

10. The method of claim 1, wherein the polyetherimide composition has a Tg from 200 to 320° C., a weight gain on immersion in water for 24 hours at 23° C. of less than 3.5%, and a coefficient of expansion from 30 to 50 ppm/° C.

11. The method of claim 1, wherein the article is manufactured by injection molding.

12. The method of claim 1, wherein the article is a food service article, a medical use article, or a personal electronics article.

13. The method of claim 12, wherein the article is a drinking glass, a bottle, a syringe, a tray, a handle, a computer enclosure, or a cell phone housing.

14. The method of claim 1, wherein the article is a pitcher, a connector, a filter housing, a pipe, a keycap, a film, or a coating.

15. A method of producing a handle or tray having low estradiol binding activity comprising,
   selecting one or more phenolic monomers from di-t-butyl hydroquinones and bis-(hydroxy aryl)-N-aryl isoindolinones,
   or,
   selecting at least two phenolic monomers from one of:
      (a) di-t-butyl hydroquinone, spiro biindane bisphenols, resorcinol, hydroquinone, methyl hydroquinone, and biphenols;
      (b) di-t-butyl hydroquinone, spiro biindane bisphenols, hydroquinone, and biphenols;
      (c) di-t-butyl hydroquinone, spiro biindane bisphenols, methyl hydroquinone, and biphenols;
      (d) di-t-butyl hydroquinone, spiro biindane bisphenols, resorcinol, hydroquinone, methyl hydroquinone, and tetramethyl bisphenol-A;
      (e) di-t-butyl hydroquinone, spiro biindane bisphenols, hydroquinone, and tetramethyl bisphenol-A;
   and,
      (f) di-t-butyl hydroquinone, spiro biindane bisphenols, methyl hydroquinone, and tetramethyl bisphenol-A;
   wherein each of said monomers do not exhibit a half maximal inhibitory concentration (IC50) less than 0.00025M for alpha or beta in vitro estradiol receptors, and
   manufacturing the handle or tray with a polyetherimide composition comprising repeating units derived from the one or more phenolic monomers, and wherein one or more residual phenolic monomers are present at more than zero but less than or equal to 1,000 ppm and do not exhibit a half maximal inhibitory concentration (IC50) less than 0.00025M for alpha or beta in vitro estradiol receptors.

16. The method according to claim 1, wherein the phenolic monomers in the polyetherimide composition consist of the selected phenolic monomers.

17. The method according to claim 15, wherein the phenolic monomers in the polyetherimide composition consist of the selected phenolic monomers.

* * * * *